(12) United States Patent
Aquino et al.

(10) Patent No.: US 11,485,643 B1
(45) Date of Patent: Nov. 1, 2022

(54) ISOMORPHOUS SUBSTITUTION OF METALS ON SYNTHESIZED ZEOLITE FRAMEWORK

(71) Applicants: TotalEnergies OneTech, Courbevoie (FR); CENTRE NATIONAL DE LA RECHERCHE SCIENTIFIQUE (CNRS), Paris (FR)

(72) Inventors: Cindy Aquino, Watermael-Boitsfort (BE); Svetlana Mintova, Basly (FR); Jean-Pierre Gilson, Fouesnant (FR); Florent Dubray, Caen (FR); Delphine Minoux, Nivelles (BE); Julien Grand, Viroflay (FR); Nikolai Nesterenko, Nivelles (BE)

(73) Assignees: TOTALENERGIES ONETECH, Courbevoie (FR); CENTRE NATIONAL DE LA RECHERCHE SCIENTIFIQUE (CNRS), Paris (FR)

( * ) Notice: Subject to any disclaimer, the term of this patent is extended or adjusted under 35 U.S.C. 154(b) by 0 days.

(21) Appl. No.: 17/768,590

(22) PCT Filed: Oct. 13, 2020

(86) PCT No.: PCT/EP2020/078771
§ 371 (c)(1),
(2) Date: Apr. 13, 2022

(87) PCT Pub. No.: WO2021/074145
PCT Pub. Date: Apr. 22, 2021

(30) Foreign Application Priority Data

Oct. 14, 2019 (EP) ..................... 19315123

(51) Int. Cl.
*C01B 39/06* (2006.01)
*B01J 20/18* (2006.01)
*B01J 29/48* (2006.01)

(52) U.S. Cl.
CPC ............ *C01B 39/06* (2013.01); *B01J 20/186* (2013.01); *B01J 29/48* (2013.01)

(58) Field of Classification Search
None
See application file for complete search history.

(56) References Cited

FOREIGN PATENT DOCUMENTS

| EP | 0476901 | A2 | | 3/1992 | |
|----|---------|----|---|--------|---|
| GB | 1247015 | A | * | 9/1971 | ............ B01J 20/186 |
| GB | 1247015 | A | | 9/1971 | |
| JP | 2019042709 | A | | 3/2019 | |
| WO | 9733830 | A1 | | 9/1997 | |
| WO | 2017068387 | A1 | | 4/2017 | |

OTHER PUBLICATIONS

Nomura et al, JP 2019042709, English Translation (Year: 2019).*

(Continued)

*Primary Examiner* — Colin W. Slifka
(74) *Attorney, Agent, or Firm* — Ewing & Jones, PLLC (57) ABSTRACT

The present disclosure relates to a novel method for introducing various metals in the structure of zeolite frameworks by isomorphous substitution. This new method is based on a hydrothermal reaction of the metal with the zeolite. This method allows obtaining zeolite with a structure and with control of the metal location.

20 Claims, 4 Drawing Sheets

(56) References Cited

OTHER PUBLICATIONS

S. Tolborg et al., "Incorporation of tin affects crystallization, morphology, and crystal composition of Sn-Beta†"; J. Mat. Chem. A., 2014, 2, 20252-20262.
N.P. Van Der Graaff et al., "Synthesis of Sn-Beta with Exclusive and High Framework Sn Content"; Chem. Cat. Chem., 2015, 10 pages.
N. Garcia Vargas et al., "Synthesis and characterization of tin(IV) MFI: Sodium inhibits the synthesis of phase pure materials"; Microporous and Mesoporous Materials, 152 (2012) 37-49.
Yong Sig Ko et al., "Synthesis and Characterization of Zirconium Silicalite-1"; Korean J. Chem. Eng. 15(4), 423-428 (1998).
Enhui Yuan et al, "Structural and Textural Characteristics of Zn-Containing ZSM-5 Zeolites and Application for the Selective Catalytic Reduction of NOx with NH3 at High Temperatures", Catalysis Surveys from Asia, Springer US, Boston, vol. 20, No. 1, , (Jan. 4, 2016), pp. 41-52.
C. M. Osmundsen et al., "Tin-containing silicates: structure-activity relations", Proc. R. Soc. A (2012) 468, 18 pages.
Yoko Joichi et al., "Stepwise Gel Preparation for High-Quality CHA Zeolite Synthesis: A Common Tool for Synthesis Diversification", Crystal Growth & Design., US, (Jul. 27, 2018), vol. 18, No. 9, 13 pages.
Chengyi Dai et al, "Chapter Two—Advances in the synthesis and catalysis of solid and hollow zeolite-encapsulated metal catalysts", Advances in Catalysis, (Nov. 13, 2018), vol. 63, 41 pages.
Natsume Koike et al, "Organic-free synthesis of zincoaluminosilicate zeolites from homogeneous gels prepared by a co-precipitation method", Dalton Transactions, (Jul. 19, 2017), vol. 46, No. 33, 12 pages.
International Search Report and Written Opinion issued in Application No. PCT/EP2020/078771, dated Dec. 21, 2020; 13 pages.
International Preliminary Report on Patentability issued in Application No. PCT/EP2020/078771, dated Sep. 17, 2021; 7 pages.

\* cited by examiner

ISOMORPHOUS SUBSTITUTION OF METALS ON SYNTHESIZED ZEOLITE FRAMEWORK

CROSS-REFERENCE TO RELATED APPLICATIONS

This application claims the benefit of PCT/EP2020/078771 filed Oct. 13, 2020, which claims priority from EP 19315123.0 filed Oct. 14, 2019, which are incorporated herein by reference in their entireties for all purposes.

FIELD OF THE DISCLOSURE

The present disclosure relates to a novel method for introducing various metals in the structure of zeolite frameworks by isomorphous substitution. This new method is based on a hydrothermal reaction of the metal with the zeolite. This method allows obtaining zeolite with control of the metal location.

BACKGROUND OF THE DISCLOSURE

Zeolites are structurally complex inorganic polymers with a three-dimensional crystalline skeleton of $TO_4$ tetrahedral. The centre of the tetrahedral is generally a silicon or aluminium atom, which corresponds to a $SiO_4$ and $AlO_4$ tetrahedron respectively. These tetrahedral are connected to each other by common oxygen atoms. The complete structure forms a three-dimensional network, exhibiting some micropores, cages and channels. They have a demonstrated track record in many applications such as catalysis, separation and ion-exchange due to their unique properties of acidic molecular sieves. In the past decades, many efforts have been devoted to tuning zeolite properties such as acidity and redox potential in order to improve their performances. Such modification of zeolite acidity and redox properties is usually performed through the introduction of transition metal atoms. The resulting properties of the material will then highly depend on the nature of the metal species introduced in the zeolite, depending itself on the way the metal was introduced in the first place.

Two main groups of metal species exist in zeolites: (i) non-framework metal species and (ii) framework metal species. Non-framework metal species are sitting in non-framework positions of the zeolite structure. On the other hand, framework metal stands for metal introduced in crystallographic tetrahedral positions from the zeolite framework thanks to a procedure called isomorphous substitution. Isomorphous substitution is a procedure allowing to replace one silicon atom from the zeolite framework with any other given elements.

Isomorphous substitution can be performed using two main approaches: (i) direct hydrothermal synthesis or (ii) post-synthesis approach. The direct synthesis approach (i) corresponds to the direct introduction of metal source within the precursor suspension (gel) prior to crystallization. The presence of metallic species in the precursors then allows replacing part of silica by other metals during the crystallization step, thus, achieving isomorphous substitution. However, the presence of metallic species in the precursor suspension (gel) is not to be considered lightly, as it can influence strongly the nucleation and crystallization step as described for the synthesis of Sn-BEA zeolite by S. Tolborg et al. [J. Mat. Chem. A., 2014, 2, 20252-20262]. Similarly, a lot of silanols can still be observed in Sn-BEA zeolite after Sn introduction in the work from N. P. Van Der Graaff [Chem. Cat. Chem., 2015, 7, 1152-1160].

N. Garcia Vargas et al. in Microporous and Mesoporous Materials 152 (2012) 37-49 reported the preparation of tin (IV) MFI where the presence of sodium hydroxide makes it difficult to have a pure Sn-MFI material.

Yong Sig Ko et al. in Korean J. Chem. Eng. 15(4), 423-428 (1998) reported the preparation of zirconium silicalite-1 (ZS-1) prepared via hydrothermal synthesis method where the zirconium precursor is incorporated directly into the zeolite precursor gel.

Similarly, WO2017/068387 A1 reported a method for the preparation of nanosized synthetic zeolite wherein the metal is incorporated in a clear solution containing the other components of the zeolite.

In WO97/33830 A1 is described the direct hydrothermal synthesis of zeolite Ti-Beta in absence of aluminium, using hydrofluoric acid (HF) in the absence of seeds, by hydrolysing a mixture of tetraethyl orthosilicate, tetraethylammonium hydroxide, water, hydrogen peroxide; adding tetraethyl ortho-titanate to the resulting suspension, and pursuing hydrolysis; evaporating off the ethanol; adding HF to the resulting mixture; and heating in an autoclave at 140° C. for 11 days. Such preparation of zeolite in the presence of fluoride anions leads to the formation of large crystals; the high toxicity of HF and the difficulties it brings when scaled-up have to be taken into consideration.

Many efforts were devoted to direct hydrothermal synthesis. However, there would be a clear advantage in having a versatile post-synthesis method allowing the introduction of various metals in the structure of zeolite frameworks by isomorphous substitution. Such method would be particularly advantaging if it could work as a simple post-treatment.

As a consequence, there is still a need for reliable methods to introduce metals in a zeolite framework. There is still a need for a method that allows producing zeolite with high crystallinity and with high ordering and homogeneity. There is still a need for a method that allows producing zeolite with high crystallinity and with high ordering and homogeneity that safety, i.e. that is fluoride agent-free. There is still a need for a method that allows producing zeolites with high crystallinity and with high ordering and homogeneity wherein the zeolites show dispersed crystals of an average size of less than 1 µm. There is still a need for a method that allows producing zeolites with high crystallinity and with high ordering and homogeneity with improved stability by comparison to the same synthetic zeolite material without metal incorporated within the zeolite framework.

SUMMARY OF THE DISCLOSURE

The aim of the present disclosure is to overcome the above-mentioned drawbacks and to provide a simple and economic preparation method leading from commonly used initial reagents to a synthetic zeolite material.

According to a first aspect, the disclosure relates to a method for the preparation of a metal-containing synthetic zeolite material comprising at least one metal M selected from W, V, Mo, Sn, Zr, Ag, Co, Ni, Cu, Ti, In, Zn and any mixture thereof, with silicon to metal M molar ratio Si/M ranging from 117 to 65440 as determined by inductively coupled plasma optical emission spectrometry; the method comprising the following steps:
 a) providing a synthetic zeolite material;
 b) optionally washing said synthetic zeolite material and drying it at a temperature of at least 50° C. for at least 2 h;

c) optionally calcining the synthetic zeolite material obtained at the previous step at a temperature of at least 200° C. for at least 1 h;

d) putting said synthetic zeolite material in a clear solution comprising one source of alkali metal M' selected from Li, Na, K, or Cs and at least one metal M wherein both M and M' are fully soluble in water and originate from the same compound; and wherein the molar ratio M'/M is of at least 1 and the weight ratio of said synthetic zeolite over said clear solution is of at least 0.5;

e) optionally stirring the solution obtained at step d) for at least 30 min, preferably at room temperature and/or atmospheric pressure;

f) heating the solution for at least 12 h and at a temperature of at least 50° C. preferably under autogenous pressure so that the solution does not evaporate;

g) separating the liquid from the solid obtained at the previous step and washing the solid obtained;

h) drying the solid obtained at the previous step and calcining it at a temperature of at least 200° C. for at least 1 h and recovering a metal-containing synthetic zeolite material.

The method of the present disclosure presents the advantage that the metal M suppresses the defects being the silanols and silanol nests. The defects are saturated with metal coordinated with 4 or 2 Si (T-atoms) with oxygen bridges depending on its coordination stage. Once saturated with the metals, said synthetic zeolite material present useful properties such as hydrophobicity, colloidal stability, and thermal resistance.

The possibility to start with a synthetic zeolite material already prepared is particularly advantaging. It allows having a good control of the properties of the starting material such as the crystal size, the Si/Al molar ratio etc. while still having the possibility to perform the substitution by the metal M.

The disclosed process wherein the heating step is of at least 12 h has been found to allow obtaining a high homogeneity in the introduction of the metal to the zeolite framework. It has also been found to allow reducing the silanol defects by comparison to the same zeolite wherein no metal devoid of metal introduced within the framework.

The present method of preparation is also advantaging in that the starting materials used in the synthesis are those commonly used in the commercial production of zeolites. In comparison with the prior art, there is no need of a fluoride-based agent. This is particularly advantaging for practical and safety reasons. The present method is also advantaging in that no extra-framework metal species in cationic and oxide forms are generated.

According to a preferred embodiment of the disclosure, the synthetic zeolite material has a BEA or an MFI or an FAU framework type, preferably, the synthetic zeolite material has a BEA or an MFI framework type, more preferably an MFI framework type.

For example, the cross-polarization spectra $\{^1H\}$ $^{29}Si$ CP MAS NMR of the metal-containing synthetic zeolite material recovered on step h) presents no peak. This indicates the absence of silanol species (i.e. defects) in the zeolite.

For example, the ratio of surface OH groups between the synthetic zeolite material provided in step a) and the metal-containing synthetic zeolite material recovered in step h) is at least 2.0; with preference at least 2.5. This indicates that the number of extra-framework species such as surface OH has been reduced by comparison to the initial synthetic zeolite material and that therefore its stability has been increased.

For example, the synthetic zeolite material comprises no aluminium, or comprises aluminium with a Si/Al molar of at least 5 as determined by inductively coupled plasma optical emission spectrometry, preferably of at least 10 or of at least 20; more preferably of at least 50; even more preferably of at least 80 and most preferably of at least 100.

With preference, whatever is the framework type of the synthetic zeolite material, one or more of the following embodiments can be used to better define the product used in the method and/or produced by the method:

The synthetic zeolite material comprises no aluminium, or comprises aluminium with a Si/Al molar of at least 5 or of at least 10 as determined by inductively coupled plasma optical emission spectrometry, preferably of at least 20; more preferably of at least 50; even more preferably of at least 80 and most preferably of at least 100.

The synthetic zeolite material comprises no aluminium, or comprises aluminium with a Si/Al molar of at most 1000 as determined by inductively coupled plasma optical emission spectrometry, preferably of at most 500; more preferably of at most 490; even more preferably of at most 450 and most preferably of at most 400 or of at most 350.

The synthetic zeolite material comprises no aluminium, or comprises aluminium with a Si/Al molar ratio ranging from 5 to 1000 as determined by inductively coupled plasma optical emission spectrometry; preferably ranging from 10 to 500; more preferably ranging from 20 to 490; even more preferably ranging from 50 to 450, most preferably ranging from 80 to 400 and even most preferably ranging from 100 to 350.

The synthetic zeolite material comprising aluminium with the Si/Al molar ratio of at least 5 as determined by inductively coupled plasma optical emission spectrometry, is obtained via dealumination.

The metal M is selected from W, V, Mo, Sn, Zr, Ag, Co, Ni, Cu, Ti, In and Zn or any mixture thereof; preferably selected from W, V, Mo, Sn, Zr, Co, Ni, Cu, Ti, In, Zn and any mixture thereof; more preferably selected from W, V, Mo, Sn, Zr, Ni, Cu, Ti, and any mixture thereof; even more preferably selected from W, V, Mo, Sn, Zr and any mixture thereof; most preferably Mo, Sn and V or any mixture thereof; and even most preferably is or comprises Mo.

The metal-containing synthetic zeolite material has a silicon to metal M molar ratio Si/M is ranging from 179 to 65440 as determined by inductively coupled plasma optical emission spectrometry; preferably ranging from 438 to 1752.

The metal-containing synthetic zeolite material has a silicon to metal M molar ratio Si/M of at least 179, preferably of at least 300, or at least 400, or at least 438.

The metal-containing synthetic zeolite material has a silicon to metal M molar ratio Si/M of at most 1800; or at most 1752; or at most 1500.

The metal-containing synthetic zeolite material comprises a metal M with a content ranging from 0.1 to 1.5 wt. % with respect to the total mass of the material measured according via EDS-TEM; preferably ranging from 0.3 to 1.2 wt. %; and more preferably ranging from 0.4 to 1.0 wt. %.

The metal-containing synthetic zeolite material has an average crystal size ranging from 10 to 800 nm preferably from 10 to 600 nm measured by scanning electron microscopy (SEM).

The metal-containing synthetic zeolite material has dispersed nanocrystals.

With preference, whatever is the framework type of the synthetic zeolite material, one or more of the following embodiments can be used to better define the method:

In the composition of the solution of step d), the molar ratio M'/M is ranges from 1 to 200, preferably from 2 to 100.

In the composition of the solution of step d), the weight ratio of said synthetic zeolite over the weight of said clear solution ranges from 0.02 to 0.5; preferably from 0.03 to 0.5.

The separation of step g) is performed by filtration, by centrifugation, by dialysis or by using flocculating agents followed by filtration.

The drying of the steps b) and/or h) is performed at 60° C. preferably 75° C. even more preferably at 90° C.

The drying of the steps b) and/or h) is performed for at least 4 h, preferably 8 h, even more preferably 24 h and at most for 72 h, preferably for at most 48 h.

The drying of the steps b) and/or h) is performed via freeze drying for 48 h.

The washing of the steps b) and/or g) are performed 2 times, preferably 3 times, even more preferably 4.

The washing of the steps b) and/or g) are performed using water.

the calcination of steps c) and/or h) is carried out at a temperature ranging from 400° C. to 800° C., preferably from 450 to 750° C. even more preferably from 500 to 600° C.

The calcination of steps c) and/or h) is carried out under an air, oxygen or inert atmosphere.

The calcination of steps c) and/or h) is carried out at atmospheric pressure.

The calcination of steps c) and/or h) is carried out in the presence of small amount of water vapours.

The calcination of steps c) and/or h) is carried out for 8 h, more preferably 24 h, even more preferably 48 h for at most 96 h, preferably 72 h.

The step f) is performed at a temperature ranging from 60° C. to 120° C.

The step f) is performed during preferably 24 h, preferably 48 h, even more preferably 72 h preferably for at most 96 h The synthetic zeolite material comprises a metal M with a content of 0.1 to 1.5 wt. % at most, with respect to the total mass of the material measured according via Energy-dispersive spectroscopy-Transmission Electron Microscopy (EDS-TEM).

For example, in step d), the source of M and M' is selected from $Na_2WO_4 \cdot 2H_2O$, $K_2WO_4$, $NaVO_3$, $KVO_3$, $Na_2MoO_4 \cdot 2H_2O$, $Na_2MoO_4 \cdot 4H_2O$, $K_2MoO_4$, $Na_2SnO_3 \cdot 3H_2O$, $K_2SnO_3 \cdot 3H_2O$, $Na_2ZrO_3$, $K_2ZrO_3$ or any mixture thereof; preferably selected from $NaVO_3$, $KVO_3$, $Na_2MoO_4 \cdot 2H_2O$, $Na_2MoO_4 \cdot 4H_2O$, $K_2MoO_4$, $Na_2SnO_3 \cdot 3H_2O$, $K_2SnO_3 \cdot 3H_2O$, or any mixture thereof preferably is or comprises $Na_2MoO_4 \cdot 4H_2O$.

According to a second aspect, the disclosure relates to the use of said synthetic zeolite material according to the first aspect as catalyst or adsorbent in gas-solid and liquid-solid reactions, as seed crystals for zeolite synthesis, and for the preparation of membranes or layers or active layers for the detection of hydrocarbons, CO, $CO_2$, NO, $NO_2$. According to a third aspect, the disclosure relates to a synthetic zeolite material obtained by the method according to the first aspect.

Definitions

Within the meaning of the present disclosure, the term "monodisperse single nanocrystals" is understood to mean that the statistical distribution of the size of the single nanocrystals is relatively narrow.

Within the meaning of the present disclosure, the term "single nanocrystals" is understood to mean individual nanocrystals or non-agglomerated nanocrystals.

In the present disclosure, the zeolite crystals are said "defect-free" or "silanol defect-free". This is understood to mean zeolite crystals comprising a negligible number of silanol-defective sites, arising from the presence of silanols and/or silanol nests. Said material is consequently highly hydrophobic due to the absence of Si—OH moisties. Silanol defects are quantified using (i) IR characterization of activated (calcined) samples, or alternatively (ii) using $^{29}$Si-NMR.

DETAILED DESCRIPTION OF THE DISCLOSURE

The disclosure relates to a method for the preparation of a metal-containing synthetic zeolite material comprising at least one metal M selected from W, V, Mo, Sn, Zr, Ag, Co, Ni, Cu, Ti, In, Zn and any mixture thereof, with silicon to metal M molar ratio Si/M ranging from 117 to 65440 as determined by inductively coupled plasma optical emission spectrometry; the method comprising the following steps:

a) providing a synthetic zeolite material;
b) optionally washing said synthetic zeolite material and drying it at a temperature of at least 50° C. for at least 2 h;
c) optionally calcining the synthetic zeolite material obtained at the previous step at a temperature of at least 200° C. for at least 1 h;
d) putting said synthetic zeolite material in a clear solution comprising one source of alkali metal M' selected from Li, Na, K, or Cs and at least one metal M wherein both M and M' are fully soluble in water and originate from the same compound and the source of M and M' is a sodium or potassium salt of the metal M, and wherein the molar ratio M'/M is of at least 1 and the weight ratio of said synthetic zeolite over said clear solution is of at least 0.5;
e) optionally stirring the solution obtained at step d) for at least 30 min, preferably at room temperature and/or atmospheric pressure;
f) heating the solution for at least 12 h and at a temperature of at least 50° C. preferably under autogenous pressure so that the solution does not evaporate;
g) separating the liquid from the solid obtained at the previous step and washing the solid obtained;
h) drying the solid obtained at the previous step and calcining it at a temperature of at least 200° C. for at least 1 h and recovering a metal-containing synthetic zeolite material.

In the preferred embodiment where water is used as solvent, de-ionized or double-distilled (dd $H_2O$) is preferred. As an example, double distillation can be performed as follows:

Tape-water is boiled, and the vapours are condensed in a clean container. The retrieved vapours are then boiled again, and retrieved in a second clean container. The as-obtained dd $H_2O$ can then be used.

With regards to step a), this step can comprise the production of a synthetic zeolite material or the mere providing of a synthetic zeolite material such as a commercial synthetic zeolite material.

For example, the synthetic zeolite material has a BEA or an MFI or a FAU framework type. For example, the synthetic zeolite material has a BEA or an MFI framework type. For example, the synthetic zeolite material has an MFI framework type. For example, the synthetic zeolite material has an MFI framework and is selected from silicalite, and/or ZSM-5.

For example, the synthetic zeolite material comprises no aluminium, or comprises aluminium with a Si/Al molar of at least 5 or of at least 10 as determined by inductively coupled plasma optical emission spectrometry, preferably of at least 20; more preferably of at least 50; even more preferably of at least 80 and most preferably of at least 100.

The synthetic zeolite material comprises no aluminium, or comprises aluminium with a Si/Al molar of at most 1000 as determined by inductively coupled plasma optical emission spectrometry, preferably of at most 500; more preferably of at most 490; even more preferably of at most 450 and most preferably of at most 400 or of at most 350.

The synthetic zeolite material comprises no aluminium, or comprises aluminium with a Si/Al molar ratio ranging from 5 to 1000 as determined by inductively coupled plasma optical emission spectrometry; preferably ranging from 10 to 500; more preferably ranging from 20 to 490; even more preferably ranging from 50 to 450, most preferably ranging from 80 to 400 and even most preferably ranging from 100 to 350.

The synthetic zeolite material comprising aluminium with the Si/Al molar ratio of at least 5 as determined by inductively coupled plasma optical emission spectrometry, is obtained via dealumination.

A high Si/Al molar ratio is also important for final application of the zeolite. Indeed, the ion exchange and the catalytic properties of a specific zeolite depend on its chemical composition and, more particularly, on its Si/Al molar ratio. The highly siliceous zeolites are organophilic and have been used for the selective adsorption of volatile organic compounds. The Si/Al molar ratio also influences the possibility of forming a membrane from the zeolite.

The low content of aluminium in the zeolite, as expressed by the Si/Al molar ratio of at least 5 has been found to allow an homogeneous introduction of metal within the framework of the zeolite.

For example, the synthetic zeolite material has an average crystal size ranging from 10 to 800 nm preferably from 10 to 600 nm measured by scanning electron microscopy (SEM). For example, the synthetic zeolite material has dispersed nanocrystals.

With regards to step d), it consists in mixing said synthetic zeolite material at a temperature of 20 to 80° C., more preferably, of 20 to 50° C. with said clear solution comprising the metal M and the alkali metal M'. As a matter of example, 10 g of zeolite can be put in a 20 g of a clear solution containing the M+M'.

The addition of the metal M and of the alkali metal M' in the solution is thus performed simultaneously. The presence of these M' alkali metal species is of first importance for the method of the present disclosure to work out, since its absence would result in the impossibility to introduce M in the zeolitic structures and would prevent the defect-healing step involving the metal M to occur.

For example, the metal M is selected from W, V, Mo, Sn, Zr, Ag, Co, Ni, Cu, Ti, In, Zn or any mixture thereof; preferably selected from W, V, Mo, Sn, Zr, Co, Ni, Cu, Ti, In, Zn and any mixture thereof; more preferably selected from W, V, Mo, Sn, Zr, Ni, Cu, Ti, and any mixture thereof; even more preferably selected from W, V, Mo, Sn, Zr and any mixture thereof; most preferably Mo, Sn and V or any mixture thereof; and even most preferably is or comprises Mo.

For example, the alkali metal M' is selected from Li, Na, K, Cs and any mixture thereof. for example, the alkali metal M' is selected from Li, Na or K, For example, the alkali metal is Na and/or K.

The sources of metal M and metal M' are thus provided by the same component being a source of both M and M'. Such components are for instance alkali metallates such as $Na_2WO_4.2H_2O$, $K_2WO_4$, $NaVO_3$, $CsVO_3$, $LiVO_3$, $KVO_3$, $Na_2MoO_4.2H_2O$, $Na_2MoO_4.4H_2O$, $K_2MoO_4$, $Na_2SnO_3.3H_2O$, $K_2SnO_3.3H_2O$, $Na_2ZrO_3$ or any mixture thereof; preferably selected from $NaVO_3$, $KVO_3$, $Na_2MoO_4.2H_2O$, $Na_2MoO_4.4H_2O$, $K_2MoO_4$, $Na_2SnO_3.3H_2O$, $K_2SnO_3.3H_2O$, or any mixture thereof preferably is or comprises $Na_2MoO_4.4H_2O$.

With regards to the step e) and/or f), it is preferably carried out by stirring the solution prepared in step d) using for example, magnetic stirring (e.g. with a magnetic stirrer), and/or by mechanical stirring, and/or by shaking and/or by orbital stirring (e.g. using an orbital shaker).

In a preferred embodiment, the stirring is performed by a magnetic stirrer during step e), after the synthesis mixture has been completed in step d). The suspension if-then transferred to an orbital shaker for the additional mixing of step f). Alternatively, the step e) and/or f) can be performed under static conditions (i.e. without agitation).

The temperature of thermal treatment of step f) can be ranging from 60° C. to 120° C., preferably from 80 to 110° C., even more preferably from 90 to 100° C.

The duration of step f) is at least 12 h, preferably at least 24 h, even more preferably 72 h and preferably at most 96 h. The time of step f) should be long enough to allow metallic species to react with silanol defective sites, thus curing silanol defects in the zeolite, isomorphously substituting in the zeolitic material.

Without willing to be bound to any theory, it is believed that the addition of metals M and M' at step d) on an already-formed zeolitic material instead of their incorporation during the synthesis method avoids that those metallic compounds interact with the nucleation step of the synthesis of the zeolite. As a result, the final particle size and morphology will be fixed during the synthesis of the zeolite and there will be no change during the incorporation of the metal M.

There is, therefore, a clear management of the particle size and morphology of the final products obtained at the end of the synthesis method of the present disclosure.

With regards to step g), it consists in a separation and recovering step (i.e. purification and/or washing step) that can preferably be performed by filtration, centrifugation, dialysis, or by using flocculating agents followed by filtration, so as to separate and recover the solid (comprising the zeolite synthetic materials) from the liquid.

The separation and recovering step g) may advantageously be repeated at least two times, and preferably 5 times, with intermediate double distilled or de-ionized water addition to the solid particles, in order to purify the solid particles.

Separation and recovering step g) is preferably performed using high-speed centrifugation.

With regards to step h) and/or c), it consists in first a drying followed by calcination.

Before calcination treatment of step h), the sample is dried. This drying step can be performed at 50 to 100° C., preferably at 80 to 90° C. The drying step is preferably performed for 12 hours.

A shorter duration of the drying step allowing to remove all the remaining water and allowing to obtain a powdered sample out of step g) may also be used. In a preferred embodiment, freeze-drying can also be performed in order to reduce drastically the chances of agglomerated particles. This is particularly preferred in case the drying step using a conventional oven yields to the formation of some agglomerates. Freeze-drying, or lyophilisation, is preferably performed at around −76 to −92° C., at sub-atmospheric pressure, for about 48 h. Once the solid is separated from the liquid, at the end of step g), it is submitted to calcination step h) (i.e. heat treatment).

The calcination of step h) is carried out at temperature of at least 200° C., preferably at a temperature ranging from 400° C. to 800° C., for example, during 1 to 10 hours approximately, under a mixture of air, oxygen, an inert gas (such as nitrogen) and preferably in the presence of small amount of water vapours (i.e. with a relative humidity of the gas used of about 1 to 5%) in order to reduce the silanol species content on the zeolite material. The calcination of step h) is needed to achieve healing of the silanol defects by metal introduction on silanol sites. Without willing to be bound to any theory, it is believed that the thermal treatment does not degrade the structure of the zeolite material due to its high thermal stability achieved thanks to the defective sites healing performed by the metals M and M'.

The same considerations apply mutatis mutandis for the calcination of step c) whereas the calcination step c) aims to remove the organic template and to make the silanol sites easily accessible for metal incorporation.

With regards the metal-containing synthetic zeolite material recovered in step h), it is defined with silicon to metal M molar ratio Si/M as determined by inductively coupled plasma optical emission spectrometry ranging from 117 to 65440 as determined by inductively coupled plasma optical emission spectrometry.

For example, the metal-containing synthetic zeolite material has a silicon to metal M molar ratio Si/M is ranging from 179 to 65440 as determined by inductively coupled plasma optical emission spectrometry; preferably ranging from 438 to 1752.

For example, the metal-containing synthetic zeolite material has a silicon to metal M molar ratio Si/M of at least 179, preferably of at least 438.

For example, the metal-containing synthetic zeolite material has a silicon to metal M molar ratio Si/M of at most 1752.

For example, the metal-containing synthetic zeolite material comprises a metal M with a content ranging from 0.1 to 1.5 wt. % with respect to the total mass of the material measured according via EDS-TEM; preferably ranging from 0.2 to 1.3 wt. %; more preferably ranging from 0.3 to 1.2 wt. %; and even more preferably ranging from 0.4 to 1.0 wt. %.

For example, the metal-containing synthetic zeolite material has an average crystal size ranging from 10 to 800 nm measured by scanning electron microscopy (SEM), preferably from 10 to 600 nm or from 40 to 700 nm.

For example, the metal-containing synthetic zeolite material has dispersed nanocrystals.

For example, the cross-polarization spectra $\{^1H\}$ $^{29}Si$ CP MAS NMR of the metal-containing synthetic zeolite material recovered on step h) presents no peak. This indicates the absence of silanol species (i.e. defects) in the zeolite.

For example, the ratio of surface OH groups between the synthetic zeolite material provided in step a) and the metal-containing synthetic zeolite material recovered in step h) is at least 2.0; with preference at least 2.5. This indicates that the number of extra-framework species such as surface OH has been reduced by comparison to the initial synthetic zeolite material and that therefore its stability has been increased.

For example, the metal-containing synthetic zeolite material has a cell volume higher than the cell volume of the same synthetic zeolite material without metal incorporated within the zeolite framework. The increase of the cell volume indicates that the metal has been introduced within the zeolite framework.

With regards to optional further steps, the method can further comprise after step h), an ion-exchange procedure in which alkali metal M' is removed from the zeolite, but metal M is kept. Such procedure can be used in case the material is intended to be used as a catalyst in acidic catalysis. In this optional embodiment, the procedure is at it follows:

After the solid powder obtained at step h) is added to an aqueous solution containing a salt of ammonium cation so that the alkali metal M' is replaced with ammonium.

The ammonium salt used is preferably ammonium chloride ($NH_4Cl$). For instance, a concentration of about 1.1 wt. % (0.02M) of $NH_4Cl$ in water can be used. For instance, 10 mL of such solution containing the ammonium can be added to 100 mg of zeolite solid product from step h) in order to proceed with the ion exchange. The procedure is preferably repeated at least twice with an intermediate separation procedure, best performed using centrifugation. The solid sample can then be retrieved and washed with water. The washing step is also performed preferably by using centrifugation.

The as-obtained material can then be dried and calcined according to the procedure described in step h).

It is believed that this procedure may generate some isolated silanol species, but the amount of silanol generated by such procedure is still very low and far below any materials that would have been synthesized using a different approach than the approach described in the present disclosure.

TABLE 1

Figure 1:
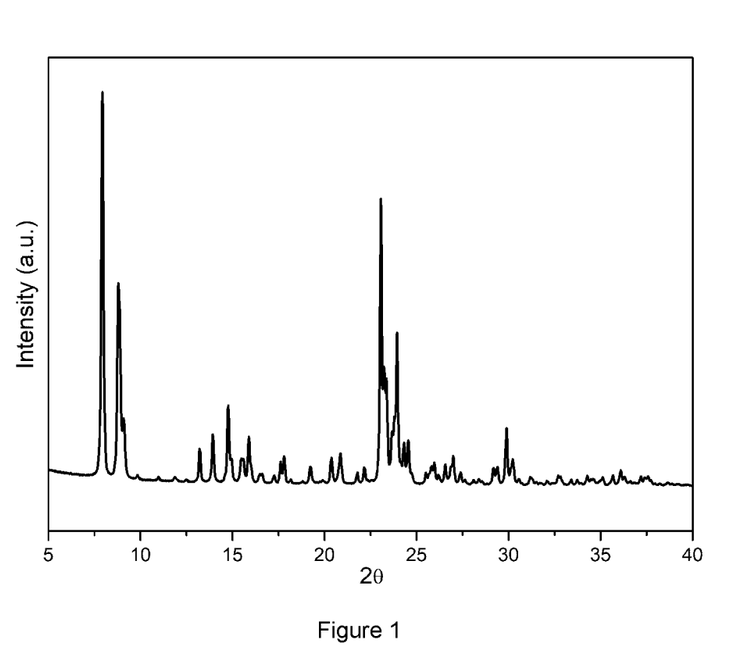
FIG. 1 represents the XRD pattern of sample Mo-Silicalite-1 obtained from step h). Splitting of diffraction peaks at 23.30, 23.75, and 24.50° 2θ is clearly observed and indicates a monoclinic symmetry of the MFI structure instead of the orthorhombic cell.
Figure 2:
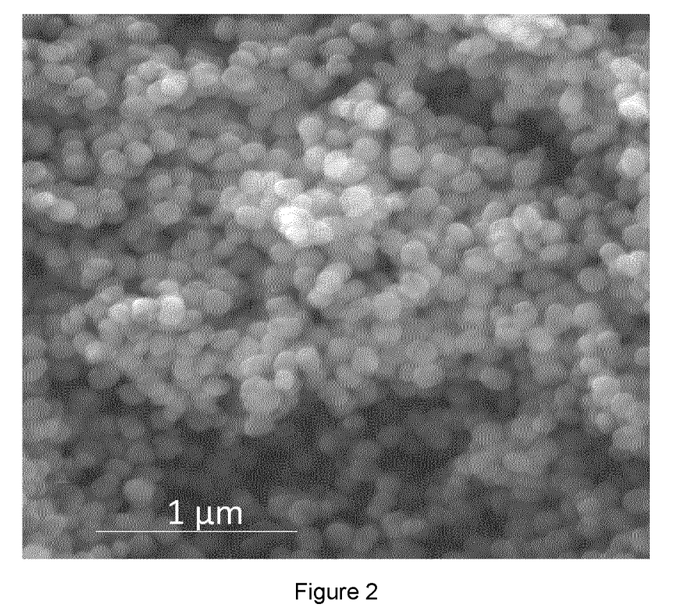
FIG. 2 shows the SEM picture of sample Mo-Silicalite-1 obtained from step h). Particles of approximately 100 to 150 nm are obtained.

| Sample | Mo-Silicalite-1 |
| Symmetry | P21/n (monoclinic) |
| --- | --- |
| a | 19.9243(5) |
| b | 20.1433(8) |
| c | 13.3985(2) |
| β | 90.6087(3) |
| Volume (Å$^3$) | 5377.10(7) |
| GOF$^a$ | 1.70 |
| Rp$^b$ | 2.47 |
| wRp$^c$ | 3.42 |

$^a$Goodness of fit
$^b$Expected R-factor
$^c$Weight Profile R-factor

Additionally, using Le Bail profile refinement of the diffraction pattern (Table 1), the space group transition towards monoclinic symmetry was confirmed, alongside a unit cell volume expansion at 5377.1 Å$^3$ (to be compared with a volume of average 5330.0 Å$^3$ for purely siliceous MFI (Silicalite-1) zeolite). Both observations indicate the successful introduction of Mo atoms in the Silicalite-1 structure.

Figure 3:
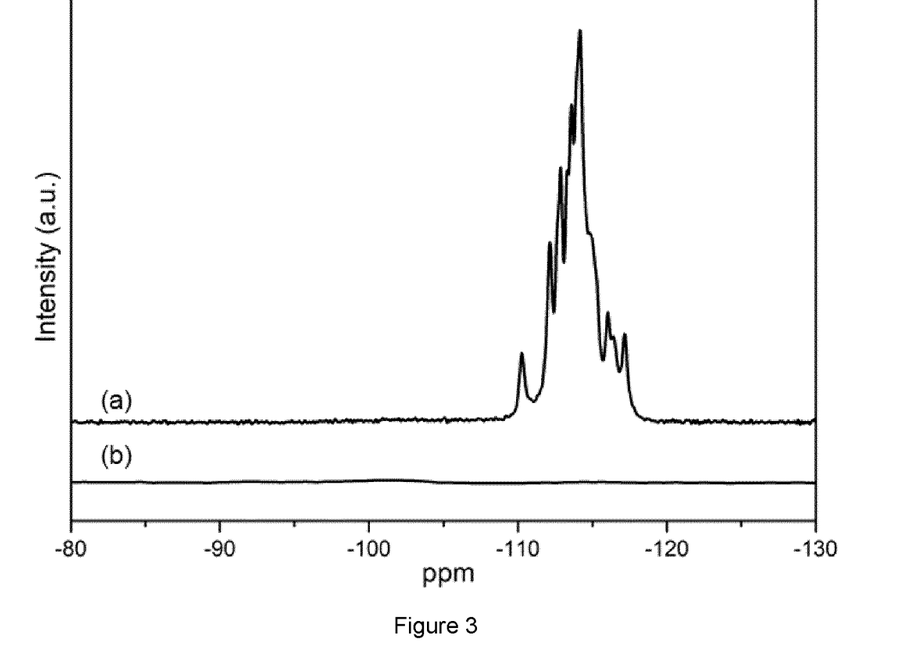
FIG. 3 represents (a) the $^{29}$Si MAS NMR spectrum of sample Mo-Silicalite-1 obtained from step h), as well as (b) the {$^1$H} $^{29}$Si CP MAS NMR experiment.

No signal is observed on the cross-polarization experiment, indicative of the absence of any silanol species for this sample. This is further supported by the absence of Q3 species in the $^{29}$Si MAS NMR spectrum. Additionally, very high resolution of the Q4 species is achieved, indicative of the very high local homogeneity of the sample, and of the absence of silanol defects.

TABLE 2

Figure 4:
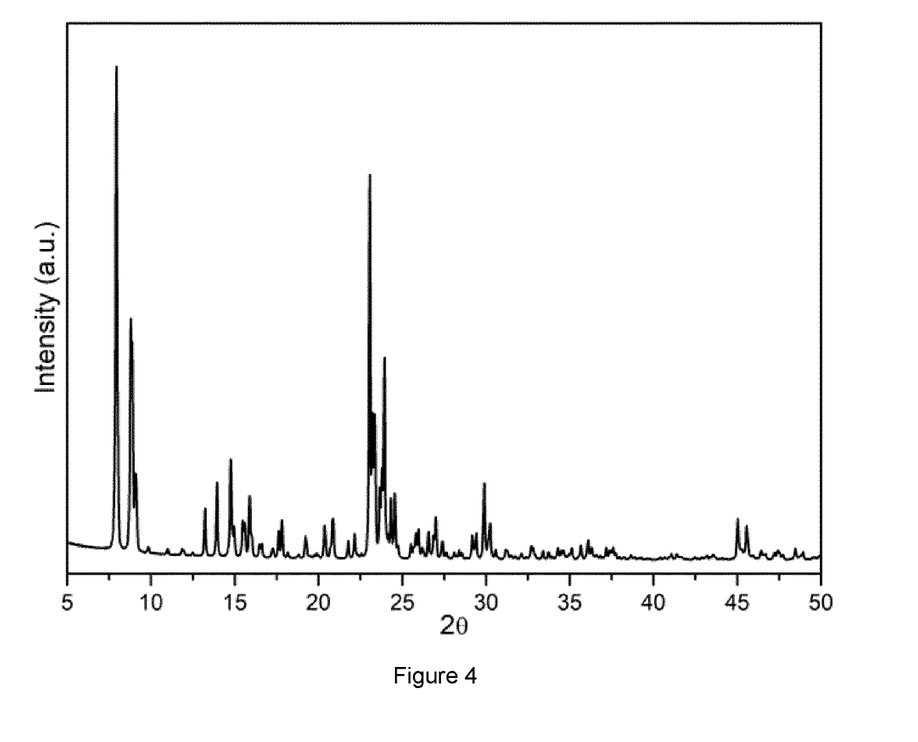
FIG. 4 represents the XRD pattern of sample Mo-ZSM-5 obtained from step h); Splitting of diffraction peaks at 23.30, 23.75, and 24.50° 2θ is clearly observed indicating the transformation from orthorhombic to monoclinic symmetry of the sample.

| Sample | Mo-ZSM-5 |
| --- | --- |
| Symmetry | P2$_1$/n (monoclinic) |
| a | 19.9101(1) |
| b | 20.1388(3) |
| c | 13.3915(7) |
| β | 90.6088(3) |
| Volume (Å$^3$) | 5369.26(6) |
| GOF$^a$ | 1.60 |
| Rp$^b$ | 2.89 |
| wRp$^c$ | 3.97 |

$^a$Goodness of fit
$^b$Expected R-factor
$^c$Weight Profile R-factor

In addition, using Le Bail profile refinement of the following XRD pattern (Table 2), the space group transition towards monoclinic symmetry is confirmed, and expansion of the unit cell volume with regards to the initial material from 5353.81 to 5369.27 Å$^3$ is measured. The higher unit cell volume of the initial ZSM-5 sample used in the preparation of Mo-ZSM-5 is attributed to the presence of aluminium.

Figure 5:
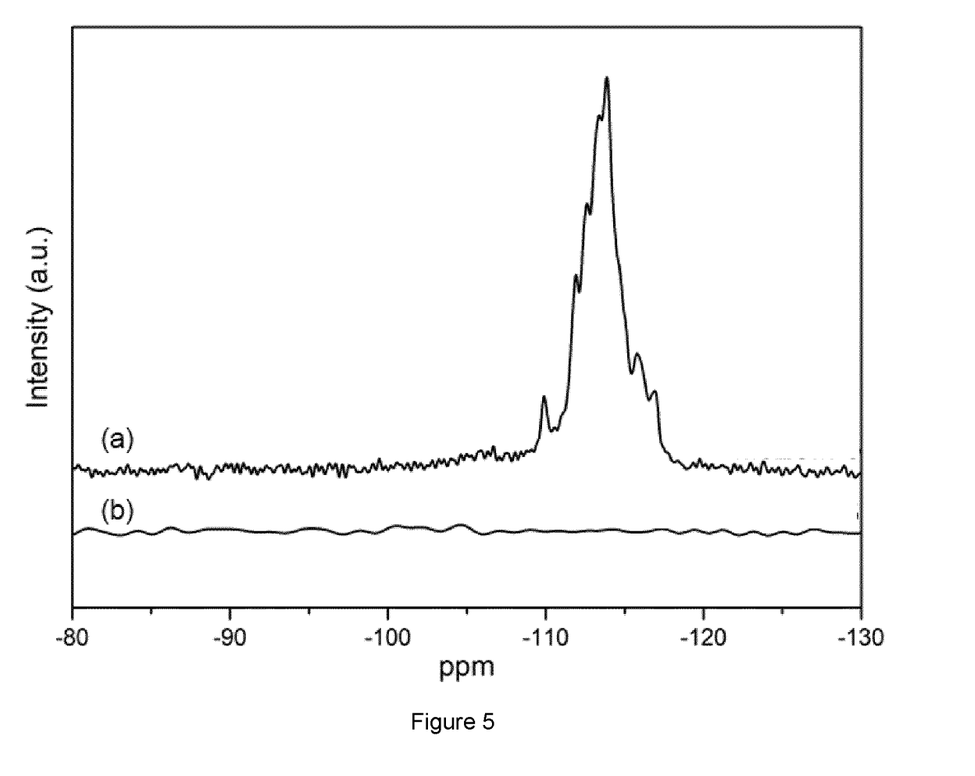
FIG. 5 represents (a) the $^{29}$Si MAS NMR spectrum of sample Mo-ZSM-5 obtained from step h), as well as (b) the {$^1$H} $^{29}$Si CP MAS NMR spectrum.

The absence of any silanol species for this sample is confirmed: no peaks corresponding to Q2 and Q3 are present in the {$^1$H} $^{29}$Si CP MAS NMR spectrum (FIG. 5). Additionally, the Q4 species are present with high resolution indicating the high local homogeneity of the sample, and the absence of silanol defects, as they are cured by the addition of Mo.

EXAMPLES

The starting materials used in the examples are as follow:
Tetraehtylorthosilicate (TEOS), 98%, from Aldrich
Tetrapropylammonium hydroxyl (TPAOH), 20 wt. % in water (1 M), from Alfa Aesar
Sodium molybdate tetrahydrated (Na$_2$MoO$_4$, 4H$_2$O), 98%, from Alfa Aesar
Aluminum nitrate (Al(NO$_3$)$_3$, 9H$_2$O) from Alfa Aesar
Double distilled water These materials were used as received from manufacturers without any further purification. The zeolite samples described in the following examples are characterized by various methods as listed below:

Scanning Electron Microscopy (SEM):
Scanning electron microscopy images of examples after step h) were recorded using a MIRA\LMH (TESCAN) microscope, with an electron beam of 30 kV.

Powder X-Ray Diffraction (XRD):
Powder samples of zeolites obtained after step h) were measured using a PANalytical X'Pert Pro X-ray diffractometer equipped with a monochromator specific to CuKα radiation (λ=1.5418 Å, 45 kV, 40 mA). Samples were measured from 3 to 70° 2θ, with a step size of 0.016°. Le Bail profile refinement of each XRD patterns was also performed.

Solid-state nuclear magnetic resonance of silicon ($^{29}$Si MAS NMR):
Powder samples obtained after step h) are packed into zirconia rotor of 4 mm outer diameter spun at 12 kHz, in a Bruker Avance III-HD 500 (11.7 T) spectrometer operating at 99.3 MHz. $^{29}$Si MAS NMR spectra are recorded from a single pulse excitation (30° flip angle), used with a recycle delay of 30 s. {1H} $^{29}$Si cross-polarization (CP) solid-state MAS NMR was acquired using a contact time of 5 ms and a recycle delay of 2 s. Chemical shifts were referenced to tetramethyl silane (TMS).

1H MAS NMR of Dehydrated Zeolite Samples
Zeolite samples were dehydrated at 200° C. overnight and directly measured in MAS NMR. Measurement performed using liquid water as a reference for the amount of hydrogen. Error for the calculated absolute values: less than 0.5 mmol/g.

Scanning Transmission Electron Microscopy with Energy Dispersive X-Ray Analysis (STEM/EDS or EDS-TEM) and High Angle Annular Dark Field Imaging (HAADF-STEM):
Experiments were performed on an Analytical double (objective and probe) corrected JEOL ARM200CF equipped with a 100 mm Centurio EDS detector, and a Quantum GIF for the EELS. A probe of 0.1 nm was used to scan the sample in STEM mode and Bright Field and High Angle Annular Dark Field detectors were simultaneously employed for imaging. Camera length was 8 cm, and two different accelerating voltages of 200 and 80 kV were used in the STEM mode for imaging and chemical analysis respectively. Owing to the enhanced Z-contrast developed at 200 kV, this configuration was used for imaging and a high-speed scanning protocol (10 μsec/px) was employed in order to prevent sample degradation under the electron beam. To avoid such degradation, STEM-EDS analytical assays were carried out at 80 kV, with a scanning speed of 3 μs/px for a mean duration of 60 minutes. A cross-correlation algorithm implemented in the Jeol Analysis Station software was applied every 30 seconds in an effort to compensate for the special drift occurring during the test. The microstructure of samples was checked prior and after each EDS scan. The method provides results in atomic % that are converted in wt. % using Tecnai Microscope control software.

Inductively coupled plasma (ICP) optical emission spectrometry was used to determine the chemical compositions using a Varian ICP-OES 720-ES. The Si/Al molar ratio or the Si/M molar ratio are determined using the said method.

Example 1

Preparation of Molybdenum (Mo) Containing Silicalite-1 Zeolite with a Fully Crystalline, Purified and Calcined Sample as Starting Material The steps 1) to 4) correspond to the normal synthesis of the Silicalite-1 zeolite. The steps 5) to 10) correspond to the isomorphous substitution of the MFI with molybdenum.

Step 1):

In a polypropylene synthesis bottle (125 mL), solution A is prepared by adding 24.591 g of TPAOH (1M) and 42.581 g of double-distilled water, under agitation performed using a magnetic stirrer. To this solution A is then added drop-wise 18.0 g of TEOS, under stirring performed by a magnetic stirrer. The solution should be water clear and liquid. Upon preparation, the gel might be slightly inhomogeneous, but the solution should end up being water-like during the ageing step (beginning of step 2). The molar composition of the as-prepared precursor suspension is the following: 0.28 TPAOH:1 $SiO_2$:40 $H_2O$ Step 2):

The bottle containing the solution prepared in step 1) is air-tightly closed with a cap. The as-made synthetic suspensions are left for ageing under magnetic stirring for 1 h, and then on an orbital shaker (225 rpm) for an additional 18 h. All the steps up to this point are performed at room temperature and ambient pressure.

Step 3):

The synthesis mixture is water-like at this point. The synthetic mixture, still in its air-tightly closed bottle, is then subjected to static hydrothermal treatment at 90° C., for a duration of 48 h.

Step 4):

The sample is removed from the oven after step 3), and cooled down to room temperature. The solid phase is then separated from the liquid phase using centrifugation. The solid is dispersed in distilled water and centrifugation is performed again. This washing procedure is repeated until the pH of the liquid separated from the solid phase is around 7-8.

Step 5) correspond to step b) and c):

The obtained solid sample is then dried in a static oven at 80° C. overnight.

The dried sample retrieved is then subjected to the following calcination procedure: In ambient atmospheric conditions (composition of the atmosphere, and atmospheric pressure), the sample is placed in a muffle furnace. The furnace heats up from room temperature to 550° C. in 5 h, holds at 550° C. for an additional 5 h, before the furnace is allowed to cool down to room temperature in 5 h.

Step 6):

300 mg of the obtained purely siliceous and fully crystalline Silicalite-1 zeolite that was calcined in step 5), is then introduced in a sealed container containing a solution composed by 0.208 g of sodium molybdate ($Na_2MoO_4 \cdot 4H_2O$) dissolved in 8.0 g of distilled water.

Step 7) (Corresponds to Step e):

The obtained suspension is mixed with a magnetic stirrer for 1 h at room temperature.

Step 8) (Corresponds to Step f):

The obtained suspension from step 7) is then placed in a static oven at 90° C. for 96 h.

Step 9) (Corresponds to Step g):

The sample is removed from the oven after step 8), and cooled down to room temperature.

The solid phase is then separated from the liquid phase using centrifugation. The solid is dispersed in distilled water and centrifugation is performed again. This washing procedure is repeated several times (around 3 to 6 times) in order to remove any unreacted species.

Step 10) (Corresponds to Step h):

The obtained solid sample is then dried in a static oven at 80° C. overnight.

The dried sample retrieved is then subjected to the following calcination procedure: In ambient atmospheric conditions (composition of the atmosphere, and atmospheric pressure), the sample is placed in a muffle furnace. The furnace heats up from room temperature to 550° C. in 5 h, holds at 550° C. for an additional 5 h, before the furnace is allowed to cool down to room temperature in 5 h. The as-obtained sample from step 8) is called Mo-Silicalite-1

Example 2

Preparation of Molybdenum (Mo) Containing ZSM-5 Zeolite with a Fully Crystalline, Purified and Calcined ZSM-5 Zeolite as Starting Material (Sample Mo-ZSM-5)

The steps 1) to 4) correspond to the synthesis of the ZSM-5 zeolite. The steps 5) to 10) correspond to the isomorphous substitution of the ZSM-5 with molybdenum.

Step 1):

In a polypropylene bottle (125 mL), solution A is prepared by adding 41.804 g of TPAOH (1M) and 0.346 g of aluminium nitrate ($Al(NO_3)_3$, $9H_2O$), under agitation using a magnetic stirrer until complete dissolution of the salt. To this solution A is then added drop-wise 24.0 g of TEOS, under stirring using a magnetic stirrer. The solution becomes water clear after 30 min (beginning of step 2). The molar composition of the as-prepared precursor suspension is the following: 0.357 TPAOH:0.004 $Al_2O_3$:1 $SiO_2$:16.189 $H_2O$ Step 2):

The bottle containing the precursor suspension prepared in step 1) is air-tightly closed with a cap. The as-made synthetic suspensions are left foraging on a magnetic stirrer for 1 h, and then on an orbital shaker for an additional 18 h (225 rpm). All the steps up to this point are performed at room temperature and ambient pressure.

Step 3):

The precursor suspension is water-like at this point. Then it is transferred into Teflon-lined autoclaves, and subjected to static hydrothermal treatment at 180° C., for a duration of 72 h.

Step 4):

The sample is removed from the oven after step 3), and cooled down to room temperature. The solid phase is then separated from the liquid phase using centrifugation. The solid is dispersed in distilled water after reaching the pH of the liquid separated from the solid phase of 7-8.

Step 5):

The obtained solid sample is then dried in a static oven at 80° C. overnight.

The dried sample retrieved is then subjected to the following calcination procedure: In ambient atmospheric conditions (composition of the atmosphere, and atmospheric pressure), the sample is placed in a muffle furnace and heated at 550° C. in 5 h, holds at 550° C. for an additional 5 h and cooled down to room temperature in 5 h. The ZSM-5 zeolite has a Si/Al molar ratio of 112 based on ICP analysis.

Step 6):
1.2 g of the fully crystalline calcined ZSM-5 zeolite (after step 5), is then introduced in a sealed container containing a solution composed by 0.800 g of sodium molybdate ($Na_2MoO_4.4H_2O$) dissolved in 25 mL of double-distilled water.

Step 7):
The obtained suspension is mixed with a magnetic stirrer for 1 h at room temperature.

Step 8):
The obtained suspension from step 7) is then placed in a static oven at 90° C. for 9 days.

Step 9):
The sample is removed from the oven after step 8), and cooled down to room temperature. The solid phase is then separated from the liquid phase using centrifugation. The solid is dispersed in distilled water and purified by centrifugation again. This washing procedure is repeated several times (3 to 6 times) in order to remove any unreacted species.

Step 10):
The obtained solid sample is then dried in a static oven at 80° C. overnight.

The dried sample retrieved is then subjected to the following calcination procedure: In ambient atmospheric conditions (composition of the atmosphere, and atmospheric pressure), the sample is placed in a muffle furnace and heated at 550° C. in 5 h, holds at 550° C. for an additional 5 h and cooled down to room temperature in 5 h. The as-obtained sample from step 8) is called Mo-ZSM-5. The analysis showed a Mo content of 0.4 wt. % with respect to the total mass of the material measured according via EDS-TEM and a Si/Mo molar ratio of 438 as determined by inductively coupled plasma optical emission spectrometry.

Example 3

Characterizations of Mo-Silicalite-1 and Mo-ZSM-5 Samples:

The XRD pattern together with the $^{29}Si$ MAS NMR spectra of samples Mo-Silicalite-1 and Mo-ZSM-5 show that Mo is perfectly substituted on the MFI structure.

Figure 6:
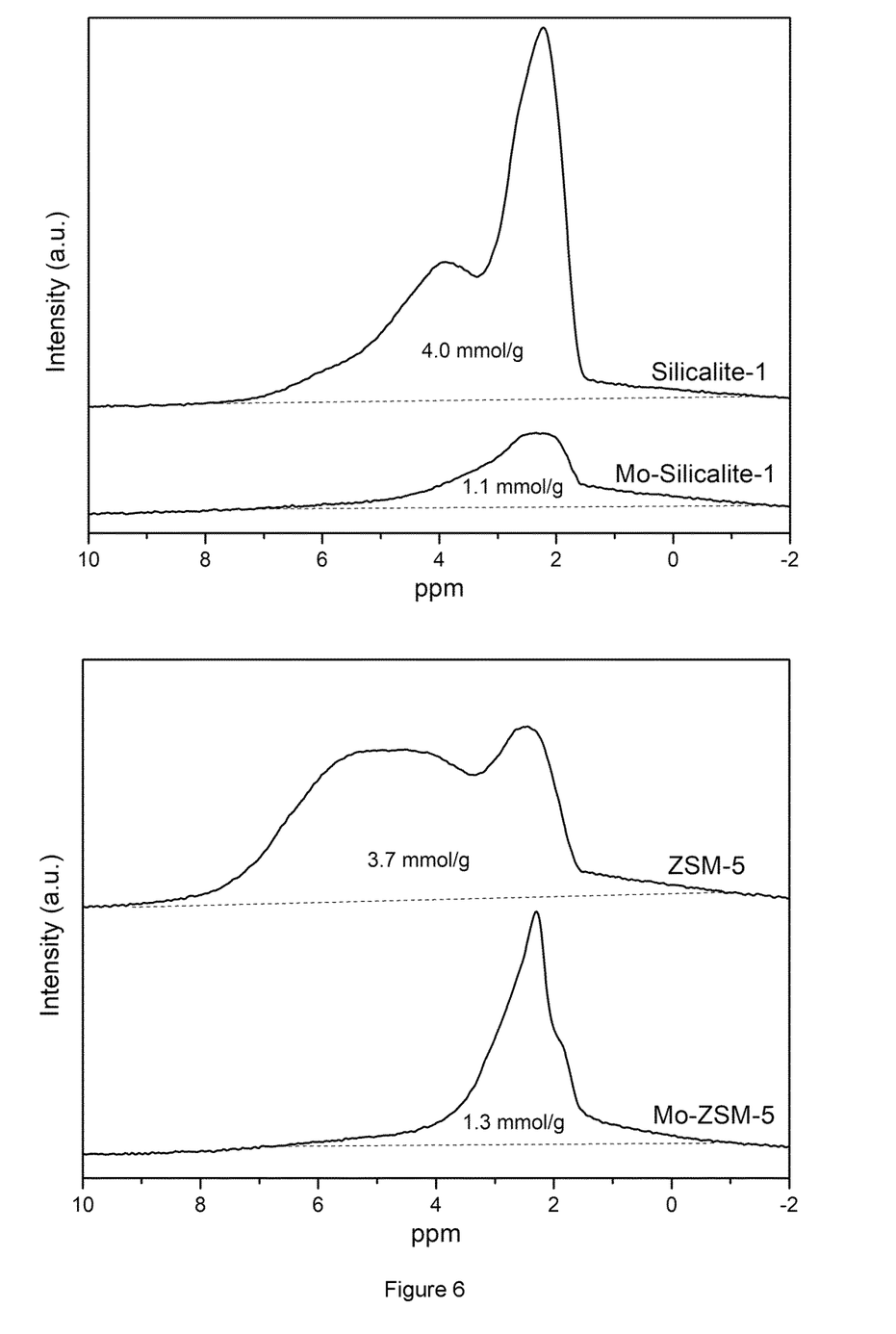
FIG. 6 represents $^1$H MAS NMR of dehydrated zeolite samples silicalite-1, Mo-silicaliste-1, ZSM-5 and Mo-ZSM-5.

The $^1H$ MAS NMR of dehydrated zeolite samples allows calculating a ratio of the concentration of surface OH when Mo is present or not. It appears that the ratio are the following:

$n$OH(Silicalite-1)/$n$OH(Mo-Silicalite-1)=3.6

$n$OH(ZSM-5)/$n$OH(Mo-ZSM-5)=2.8

There is consequently respectively 3.6 and 2.8 OH groups in the initial Mo free samples for every OH groups in the corresponding Mo-containing sample.

The invention claimed is:

1. A method for the preparation of a metal-containing synthetic zeolite material comprising at least one metal M selected from W, V, Mo, Sn, Zr, Ag, Co, Ni, Cu, Ti, In, Zn and any mixture thereof, with silicon to metal M molar ratio Si/M ranging from 117 to 65440 as determined by inductively coupled plasma optical emission spectrometry; the method comprising the following steps:
  a) providing a synthetic zeolite material;
  b) optionally washing said synthetic zeolite material and drying it at a temperature of at least 50° C. for at least 2h;
  c) optionally calcining the synthetic zeolite material obtained at the previous step at a temperature of at least 200° C. for at least 1h;
  d) putting said synthetic zeolite material in a clear solution comprising one source of alkali metal M' selected from Li, Na, K, or Cs and at least one metal M wherein both M and M' are fully soluble in water and originate from the same compound; and wherein the molar ratio M'/M is of at least 1 and the weight ratio of said synthetic zeolite over said clear solution containing M and M' ranges from 0.03 to 0.5;
  e) optionally stirring the solution obtained at step d) for at least 30 min, preferably at room temperature and/or atmospheric pressure;
  f) heating the solution for at least 12h and at a temperature of at least 50° C. preferably under autogenous pressure so that the solution does not evaporate;
  g) separating the liquid from the solid obtained at the previous step and washing the solid obtained;
  h) drying the solid obtained at the previous step and calcining it at a temperature of at least 200° C. for at least 1h and recovering a metal-containing synthetic zeolite material;
  wherein the ratio of surface OH groups between the synthetic zeolite material provided in step a) and the metal-containing synthetic zeolite material recovered in step h) is at least 2.0.

2. The method according to claim 1, characterized in that the silicon to metal M molar ratio Si/M is ranging from 179 to 65440 as determined by inductively coupled plasma optical emission spectrometry.

3. The method according to claim 1, characterized in that said synthetic zeolite material has a BEA or an MFI or an FAU framework type, preferably an MFI framework type.

4. The method according to claim 1, characterized in that when the synthetic zeolite material comprises no aluminium, or in that said synthetic zeolite material contains comprises aluminium the Si/Al molar ratio of at least 5 as determined by inductively coupled plasma optical emission spectrometry, preferably the Si/Al molar ratio ranging from 10 to 500 as determined by inductively coupled plasma optical emission spectrometry.

5. The method according to claim 1, characterized in that when the synthetic zeolite material comprises aluminium the Si/Al molar ratio is of at least 10; preferably of at least 50; more preferably of at least 80.

6. The method according to claim 1, characterized in that said synthetic zeolite material comprising aluminium with the Si/Al molar ratio of at least 5 as determined by inductively coupled plasma optical emission spectrometry, is obtained via dealumination.

7. The method according to claim 1, characterized in that said metal M is selected from W, V, Mo, Sn, Zr, Co, Ni, Cu, Ti, In, Zn and any mixture thereof.

8. The method according to claim 1, characterized in that said metal M is selected from Mo, Sn, V and any mixture thereof.

9. The method according to claim 1, characterized in that said metal M is Mo.

10. The method according to claim 1, characterized in that in step d), the source of M and M' is selected from $Na_2WO_4.2H_2O$, $K_2WO_4$, $NaVO_3$, $KVO_3$, $Na_2MoO_4.2H_2O$, $Na_2MoO_4.4H_2O$, $K_2MoO_4$, $Na_2SnO_3.3H_2O$, $K_2SnO_3.3H_2O$, $Na_2ZrO_3$, $K_2ZrO_3$, or any mixture thereof preferably selected from $NaVO_3$, $KVO_3$, $Na_2MoO_4.2H_2O$, $Na_2MoO_4.4H_2O$, $K_2MoO_4$, $Na_2SnO_3.3H_2O$, $K_2SnO_3.3H_2O$, or any mixture thereof; more preferably is $Na_2MoO_4.4H_2O$.

11. The method according to claim 1, characterized in that the alkali metal M' selected from Na and/or K.

12. The method according to claim 1, characterized in that in the composition of the solution of step d) the molar ratio M′/M ranges from 1 to 200, preferably from 2 to 100.

13. The method according to claim 1, characterized in that the ratio of surface OH groups between the synthetic zeolite material provided in step a) and the metal-containing synthetic zeolite material recovered in step h) is at least 2.5.

14. The method according to claim 1, characterized in that the metal-containing synthetic zeolite material comprises a metal M with a content ranging from 0.1 to 1.5 wt. % with respect to the total mass of the material measured according via EDS-TEM.

15. The method according to claim 1, characterized in that the metal-containing synthetic zeolite material comprises a metal M with a content ranging from 0.3 to 1.2 wt. % with respect to the total mass of the material measured according via EDS-TEM.

16. The method according to claim 1, characterized in that the metal-containing synthetic zeolite material comprises a metal M with a content ranging from 0.4 to 1.0 wt. % with respect to the total mass of the material measured according via EDS-TEM.

17. The method according to claim 1, characterized in that the metal-containing synthetic zeolite material has an average crystal size ranging from 10 to 800 nm preferably from 10 to 600 nm measured by scanning electron microscopy (SEM).

18. The method according to claim 1, characterized in that the metal-containing synthetic zeolite material has dispersed nanocrystals.

19. The method according to claim 1, characterized in that one or more of the following is true:
  the drying of the steps b) and/or h) is performed at 60° C.; and/or
  the drying of the steps b) and/or h) is performed for at least 4 h; and/or
  the drying of the steps b) and/or h) is performed via freeze-drying for 48 h.

20. The method according to claim 1, characterized in that one or more of the following is true:
  the calcination of steps c) and/or h) is carried out at a temperature ranging from 400° C. to 800° C., under an air, oxygen or inert atmosphere; and/or
  the calcination of steps c) and/or h) is carried out for 8 h.

* * * * *